L. J. STRUCK & J. O. DEAN.
TRIMMING ATTACHMENT FOR APPLE PARING MACHINES.
APPLICATION FILED DEC. 3, 1917.
1,276,131.   Patented Aug. 20, 1918.
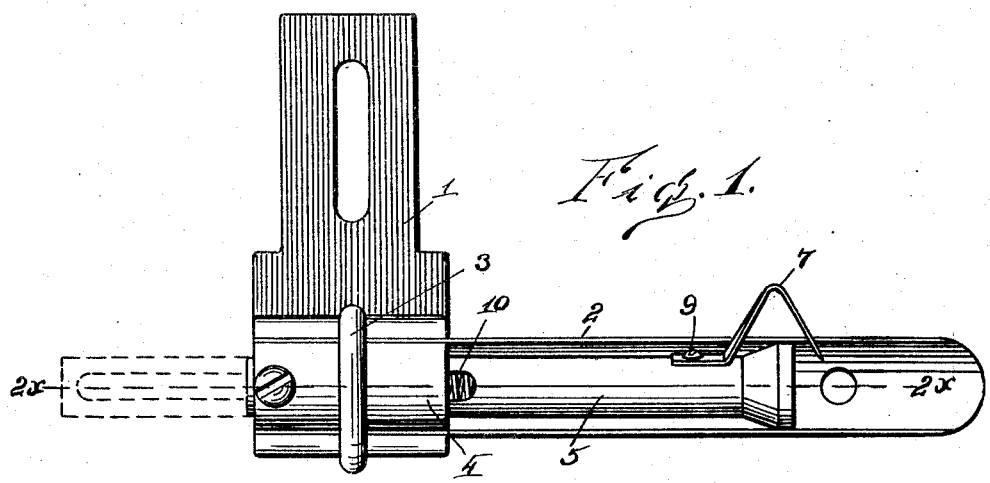
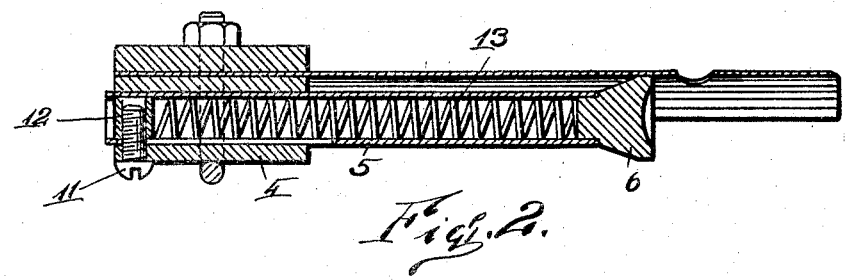
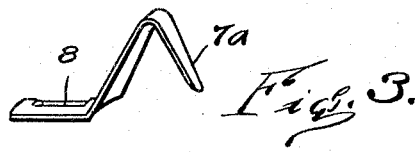

UNITED STATES PATENT OFFICE.

LEONARD J. STRUCK AND JOHN O. DEAN, OF ROCHESTER, NEW YORK.

TRIMMING ATTACHMENT FOR APPLE-PARING MACHINES.

1,276,131.                    Specification of Letters Patent.    Patented Aug. 20, 1918.

Application filed December 3, 1917. Serial No. 205,225.

*To all whom it may concern:*

Be it known that we, LEONARD J. STRUCK, a citizen of the United States, and JOHN O. DEAN, a citizen of the Dominion of Canada, both residing at Rochester, in the county of Monroe and State of New York, have invented certain new and useful Improvements in Trimming Attachments for Apple-Paring Machines, of which the following is a specification.

The object of this invention is to provide a trimmer to be used on machines that automatically pare and core apples, such machines being described in the patents to Boutell Nos. 590,205, 892,393 and 974,230, and many others.

Apple paring machines have forks on which the apples are impaled and by which the apples are rotated in contact with a knife which cuts the peel therefrom. The apples are usually placed thereon with the stem end forward.

These machines always leave a small ring of peel around the blow end of each apple. The object of this invention is to provide a trimming attachment that will cut off this peel.

Another object of the invention is to regulate the depth to which the trimmer will cut into the apple.

These and other objects of the invention will be illustrated in the drawings, described in the specification and pointed out in the claims at the end thereof.

In the drawings,

Figure 1 is a side elevation of the coring spoon of an apple paring machine, equipped with our improved trimmer.

Fig. 2 is a longitudinal section on the line 2×—2× of Fig. 1.

Fig. 3 is a perspective view of the trimming knife.

In the drawings, like reference numerals indicate like parts.

In the drawings, reference numeral 1 indicates the corer bracket or arm. 2 indicates the coring spoon and 3 indicates the U shaped bolt by which the coring spoon is clamped to the bracket. Interposed between the clamp and the corer is the sleeve 4.

Mounted to slide in the sleeve 4 is the stem 5 on the outer end of which is carried an enlarged blunt head 6. Fastened to the stem 5 is the trimming knife 7, which knife is made of a flat piece of steel, the shank of which is clamped against the cylindrical surface of the stem and extends parallel to its axis. The blade of the knife is reversely bent away from the stem to a V shape, the outer end 7ᴬ which carries the cutting edge is made straight and points forward and centrally to the axis of the apple. This outer end with the coring device is intended to cut a bevel shaped ring from the blow end of the apple. The shank of the knife is slotted as indicated at 8 so that it may be adjustably clamped to the stem 5 by the screw 9.

The stem is slotted as indicated at 10 and through this slot passes a screw 11 which is set in the sleeve 4. A collar 12 is provided in the stem 5 with which the screw 11 engages. The screw 11 and the collar 12 remain stationary in the sleeve 4 and the stem 5 can slide back and forth through the sleeve 4 within the limits fixed by the engagement between the screw 11 and the slot 10. The stem 5 is hollow and a spring 13 is carried inside thereof, the forward end of which presses against the head 6 and the other end presses against the collar 12. By reason of this arrangement the sleeve and its head and trimming knife are normally held in the position shown in Figs. 1 and 2. When the spoon and its bracket are moved forward for the purpose of coring and trimming an apple, the spoon will penetrate the apple and cut the core around the fork on which the apple is engaged or impaled. The knife 7 is forced into the apple by the spring 13 until the head 6 strikes against the butt end of the core and its forward movement is arrested thereby and both the stem 5 and knife 7 then remain stationary while the coring spoon continues to advance to finish the cutting of the core. In so doing, it compresses the spring 13.

It will be understood that the apple is rotating continually and the coring spoon 2 penetrates the apple and begins to cut the core in advance of the knife 7.

The knife 7 penetrates the apple immediately around the core and cuts a small annular section therefrom around the core and does it while the corer is cutting the apple from the core. The depth of the cut of the knife 7 is limited by the end of the stem 5 which engages the end of the core and stops while the coring spoon goes on. The end of the stem therefore acts as a gage for the knife 7. The knife 7 is adjustable on the stem but it will ordinarily be set at a depth of about an eighth of an inch or a little more as the unevenness of the apples may require.

When the coring spoon is withdrawn it takes the apple with it and as soon as the apple is pushed off from the coring spoon, the spring 13 expands and pushes the stem out to the position shown in Figs. 1 and 2 ready to be brought into action with the next apple.

The fork on which the apples are impaled is made short so that it will not project through the end of the smallest apples that will be peeled. This attachment will be made of such dimensions that when it is fastened in place on the machine, the end of the stem will stop short of the end of the fork and not come in contact with it even if no apple be placed thereon and the end of the knife 7 will overlap the end of the fork if empty but will not extend centrally into engagement with it.

The stem is yieldingly held in position by a spring so that it will accommodate itself to any size of apple and firmly press against it.

This attachment can be used with any of the well-known types of paring machines and as the machines proper constitute no part of this invention, they are omitted from the disclosure of this application, a reference to the patents above enumerated which show such machines being deemed sufficient.

I claim:

1. In an apple paring machine, the combination of a coring device, a stem mounted to slide therein, a spring contained therein for holding it yieldingly in normal position, a trimming knife attached to said stem, said knife being V shaped and having the outer end thereof pointing forward and centrally toward the axis of the apple.

2. In an apple paring machine, the combination of a stem, a support therefor, a spring in said stem for yieldingly holding said stem in normal position on said support, a trimming knife attached to said stem, said knife being V shaped and having the outer end thereof pointing forward and centrally toward the axis of the apple.

3. In an apple paring machine, the combination of a stem, a support therefor, a spring in said stem for yieldingly holding said stem in normal position on said support, a trimming knife attached to said stem, said knife being V shaped and having the outer end thereof pointing forward and centrally toward the axis of the apple, said knife having a shank that lies flat on the cylindrical surface of said stem, said shank being adjustable along said stem parallel to the axis thereof.

4. In an apple paring machine, the combination of a sleeve, a stem mounted to slide therein, a spring contained in said stem, a slot in said stem extending parallel to its axis, a screw set in said sleeve extending through said slot and engaging one end of said spring, the other end of said spring pressing against the end of the stem and holding it yieldingly in position, a trimming knife carried on said stem.

5. In an apple paring machine, the combination of a sleeve, a stem mounted to slide therein, a spring supported by said sleeve pressing on said stem for yieldingly holding it in normal position, a trimming knife carried on said stem.

6. In an apple paring machine, the combination of a sleeve, a stem mounted to slide therein, a spring supported by said sleeve pressing on said stem for yieldingly holding it in normal position, a trimming knife carried on said stem, said stem having a cup shaped end.

In testimony whereof we affix our signatures.

LEONARD J. STRUCK.
JOHN O. DEAN.